United States Patent [19]

Chikuma

[11] Patent Number: 5,295,550
[45] Date of Patent: Mar. 22, 1994

[54] FOUR-WHEEL STEERING APPARATUS

[75] Inventor: Isamu Chikuma, Maebashi, Japan

[73] Assignee: NSK Ltd., Tokyo, Japan

[21] Appl. No.: 754,738

[22] Filed: Sep. 4, 1991

[30] Foreign Application Priority Data

| | | | |
|---|---|---|---|
| Sep. 7, 1990 | [JP] | Japan | 2-235553[U] |
| Oct. 1, 1990 | [JP] | Japan | 2-102240[U] |
| Oct. 17, 1990 | [JP] | Japan | 2-107998[U] |
| Oct. 17, 1990 | [JP] | Japan | 2-107999 |

[51] Int. Cl.$^5$ .............................................. B62D 5/04
[52] U.S. Cl. ...................................... 180/79.1; 280/91
[58] Field of Search ............... 180/79.1, 140; 280/91; 318/2, 488, 489

[56] References Cited

U.S. PATENT DOCUMENTS

| | | | |
|---|---|---|---|
| 4,893,688 | 1/1990 | Morshita | 180/79.1 |
| 4,976,328 | 12/1990 | Ohmura | 280/91 X |
| 5,007,494 | 4/1991 | Ohmura et al. | 280/91 X |

FOREIGN PATENT DOCUMENTS

| | | | |
|---|---|---|---|
| 57-99470 | 6/1982 | Japan | 180/79.1 |
| 59-67170 | 4/1984 | Japan | 180/79.1 |
| 0185674 | 9/1985 | Japan | 280/91 |
| 0077570 | 4/1986 | Japan | 280/91 |
| 62-26922 | 6/1987 | Japan | 180/79.1 |
| 0265770 | 11/1988 | Japan | 280/91 |
| 1-41656 | 12/1989 | Japan | 180/79.1 |
| 0099468 | 4/1990 | Japan | 280/91 |

*Primary Examiner*—Margaret A. Focarino
*Assistant Examiner*—Florian Zeender
*Attorney, Agent, or Firm*—Shapiro and Shapiro

[57] ABSTRACT

A four-wheel steering apparatus operates such that only when the vehicle velocity is lower than a predetermined value, is the provision of the steering angle to the rear wheels electrically controlled by the steering angle sensor for the front wheels and vehicle velocity sensor while at a high-speed traveling, the provision of the steering angle to the rear wheels is performed by the compliance steering mechanism. Hence the control and stability are improved as compared with the case where the steering angle is given to the rear wheels electrically even at a high-speed traveling.

13 Claims, 4 Drawing Sheets

FOUR-WHEEL STEERING APPARATUS

BACKGROUND OF THE INVENTION

1. Field of the Invention

The present invention relates to a four-wheel steering apparatus. More particularly, the present invention relates to a four-wheel steering apparatus utilized as a steering apparatus for an automobile, such that when the automobile changes lanes, not only the direction of the front wheels changes, but the direction of the rear wheels is also allowed to change. Accordingly the turning radius becomes smaller and the traveling stability of the vehicle is maintained.

2. Related Background Art

In order to change lanes with ease in a narrow road, the turning radius of an automobile should be small. Also, the stability of the vehicle should be maintained in changing lanes at high-speed traveling. To this end, there has been in use in recent years a four-wheel steering apparatus wherein not only the front wheels are moved but the rear wheels are also moved when the steering wheel is operated.

The steering center of each of the rear wheels is positioned backward from the point of the force applied (grounding point), as considered in the advancing direction of the vehicle, and the rear-wheel output shaft, which provides steering angles for the aforesaid rear wheels, is supported resiliently with a slight freedom of displacement in the axial direction. Hence, the stability of the vehicle is maintained in changing lanes at high-speed traveling by providing the rear wheels with the steering angle of the same phase as the front wheels on the basis of centrifugal force. This method has been proposed conventionally as disclosed in Japanese Utility Model Publication No. 1-41656, for example, and is in use practically in some quarters.

However, in the case of the conventional structure disclosed in the above-mentioned publication, there occurs a case where an optimum steering angle is not necessarily given to the rear wheels depending on the vehicle velocity because the structure is such that by mechanically coupling the front-wheel steering mechanism and the rear-wheel steering mechanism, a steering angle is given to the rear wheels in a predetermined relationship irrespective of the vehicle velocity when a steering angle provided for the front wheel exceeds a predetermined degree.

It is possible to provide the rear wheels with a steering angle under an optimum condition at all times if the front-wheel steering mechanism and the rear-wheel steering mechanism are coupled electrically, so that the steering angle given to the rear wheels may be varied not only by the steering angle given to the front wheels but also by the vehicle velocity. However, if the front-wheel steering mechanism and the rear-wheel steering mechanism are simply coupled electrically, it is necessary to enhance the so-called fail-safe mechanism substantially which leads to the unavoidable increase in its manufacturing cost. More particularly, when coupling the front-wheel steering mechanism and the rear-wheel steering mechanism, if the steering angle given to the rear wheels at a high-speed traveling should also be controlled by electrically, a double- or triple-fail-safe mechanism should be incorporated to prevent the vehicle from being in a critical condition even when a controller should become out of order at high-speed traveling, thus making the manufacturing cost significantly high.

SUMMARY OF THE INVENTION

An object of the present invention is to provide a four-wheel steering apparatus for providing the rear wheels with steering angles by the use of a so-called compliance steering mechanism, and wherein the steering angle is given to the rear wheels electrically only when the traveling velocity of the vehicle is comparatively low while the steering angle is given to the rear wheels by so-called compliance steering on the basis of centrifugal force when the track should be changed at a high-speed traveling.

Another object of the present invention is to provide a four-wheel steering apparatus which is structured to allow the rear wheels to be returned to the neutral position if a steering angle which is not appropriate for the rear-wheels happens to be provided in traveling at a low speed due to a partial failure of the controller or the like.

Still another object of the present invention is to provide a four-wheel steering apparatus having a function to detect whether or not each of the constituents thereof is in normal operation so that any trouble can be found early.

A further object of the present invention is to provide a four-wheel steering apparatus capable of preventing any excessive electric current to the electric motor so as not to burn out the electric motor, as well as to restrict any excessive consumption of the electric power to prevent any trouble occurring in the battery.

The four-wheel steering apparatus of the present invention may have a rear-wheel output shaft for providing the rear wheels with steering angles according to a detected steering angle given to the front wheels, as well as by passive displacement (under centrifugal force) in the axial direction; an electric motor for displacing this rear-wheel output shaft in the axial direction through a speed reducing mechanism; a vehicle velocity sensor to detect the vehicle velocity; and a controller to control the energizing of the aforesaid electric motor in accordance with signals from the aforesaid steering angle sensor and vehicle velocity sensor.

Only when the vehicle velocity detected by the vehicle velocity sensor is lower than a predetermined value is the electric motor utilized in providing the rear wheels with the steering angles. Also, the aforesaid reducing mechanism is made reversible to allow the steering center of the aforesaid rear wheels to be positioned backward from the point of force applied for the rear wheels in the advancing direction, and further, the aforesaid rear-wheel output shaft is resiliently supported with a slight freedom of displacement in the axial direction with respect to the vehicle body.

The function of the four-wheel steering apparatus structured as above according to the present invention is described generally below:

When the vehicle travels at a velocity lower than the predetermined velocity, the controller controls the energy to the electric motor in accordance with signals from the the steering angle sensor and vehicle velocity sensor to provide the rear wheels with the steering angles as required.

Also, if the vehicle travels at a speed exceeding a predetermined velocity, the provision of the steering angles to the rear wheels is not performed by the electric motor, irrespective of the signals from the steering angle sensor and vehicle velocity sensor.

If lanes are changed in the case where the vehicle travels at a speed exceeding a predetermined velocity, the steering angle is given to the rear wheels with the same phase as the front wheels on the basis of centrifugal force, and the vehicle stability is maintained at the time of the lane changing.

With the above-described construction, the mechanism needed for suspending the provision of the steering angles to the rear wheels by the electric motor may be quite simple. It is also possible to secure sufficient reliability of such mechanism and to make the accompanying fail-safe mechanism also simple and highly reliable.

Further, the four-wheel steering apparatus of the present invention may have a steering angle sensor for detecting the steering angles given to the front wheels; a rear-wheel output shaft for providing the rear wheels with the steering angles by displacing in the axial direction; an electric motor for displacing this rear-wheel output shaft in the axial direction; a vehicle velocity sensor for detecting the vehicle velocity; a clutch electrically operable to be connected or disconnected between the rotational driving shaft of the aforesaid electric motor and the aforesaid rear-wheel output shaft; a displacement sensor for detecting the steering angles given to the rear wheels on the basis of the displacement of the aforesaid rear-wheel output shaft; and a controller for controlling the energy to the aforesaid electric motor and the connection and disconnection of the aforesaid clutch.

In addition, the structure is arranged so as to position the steering center of the aforesaid rear wheels backward from the point of the force applied, as considered in the advancing direction of the vehicle, and to support the aforesaid rear-wheel output shaft resiliently with a slight freedom of displacement in the axial direction with respect to the vehicle body.

The aforesaid controller causes the aforesaid clutch to be connected only when the vehicle velocity detected by the aforesaid vehicle velocity sensor is lower than a predetermined value. If any abnormality is detected by the signals from the respective sensors, the aforesaid controller disconnects the aforesaid clutch after gradually shifting the aforesaid rear-wheel output shaft to the neutral position by the electric motor with the aforesaid clutch still being connected.

Further, the four-wheel steering apparatus according to the present invention may have a damper mechanism which provides resistance to the displacement of the aforesaid rear-wheel output shaft and at the same time, enables the aforesaid controller to disconnect the aforesaid clutch immediately when an abnormality is detected by the signals from the respective sensors while the vehicle velocity is lower than a predetermined value.

The function of the four-wheel steering apparatus structured as above according to the present invention is described generally below.

When the vehicle travels at a speed lower than a predetermined velocity, the controller causes the clutch to be connected and at the same time, controls the energizing of the electric motor in accordance with the signals from the steering angle sensor and vehicle velocity sensor for the provision of a desired steering angle to the rear wheel as required.

Also, when the vehicle travels at a speed exceeding a predetermined velocity, the controller causes the clutch to be disconnected, and provides the state that the provision of the steering angle to the rear wheels is not performed by the electric motor, irrespective of the signals from the steering angle sensor and vehicle velocity sensor.

Thus, if the vehicle changes lanes in traveling at a speed exceeding a predetermined velocity, the steering angle is given to the rear wheels at the same phase for the front wheels on the basis of centrifugal force, so that the stability of the vehicle is maintained at the time of such lane changing.

The mechanism needed for suspending the provision of steering angle by the electric motor when the vehicle travels at a speed exceeding a predetermined velocity can be a simple one, and not only it is possible to obtain the sufficient reliability of such mechanism, but it is also possible to make the fail-safe mechanism associated therewith simple and highly reliable.

Further, when the vehicle travels at a speed lower than a predetermined value, if a part of the controller or the like becomes out of order to allow an excessive steering angle to be given to the rear wheels, the aforesaid controller cancels such steering angle given to the rear wheels and causes them to return to the neutral position (the position where no steering angle is given in either direction).

In other words, in the case of the four-wheel steering apparatus of the present invention, if an abnormality is detected, the aforesaid rear-wheel output shaft is gradually shifted toward the neutral position by the electric motor while the clutch is still connected. Then, the aforesaid clutch is disconnected to allow the rear wheels to return to the neutral position.

Also, in the case of the four-wheel steering apparatus of the present invention, if an abnormality is detected, the clutch is disconnected, and by the resiliency of the resilient member supporting the rear-wheel output shaft with respect to the vehicle body, this rear-wheel output shaft and the rear wheels mechanically coupled to the rear-wheel output shaft are returned to the neutral position. At this juncture, the rear-wheel output shaft and the rear-wheels are shifted gradually toward the neutral position by virtue of the function of the damper mechanism.

Further, the four-wheel steering apparatus of the present invention may have a steering angle sensor for detecting the steering angles given to the front wheels; a rear-wheel output shaft for providing the rear wheels with the steering angles by displacing in the axial direction; an electric motor for displacing this rear-wheel output shaft in the axial direction; a vehicle velocity sensor for detecting the vehicle velocity; a clutch electrically operable connected or disconnected between the rotational driving shaft of the aforesaid electric motor and the aforesaid rear-wheel output shaft; a displacement sensor for detecting the steering angles given to the rear wheels on the basis of the displacement of the aforesaid rear-wheel output shaft; and a controller for controlling the energy to the aforesaid electric motor and the connection and disconnection of the aforesaid clutch.

In addition, the structure is arranged so as to position the steering center of the aforesaid rear-wheels backward from the point of the force applied, as considered in the advancing direction of the vehicle, and to support the aforesaid rear-wheel output shaft resiliently with a slight freedom of displacement in the axial direction with respect to the vehicle body.

The aforesaid controller has a first function to cause the aforesaid clutch to be connected only when the vehicle velocity detected by the aforesaid vehicle velocity sensor is lower than a predetermined value.

The controller has in addition to the aforesaid first function a second function to energize the electric motor in a short period, immediately after the actuation of the vehicle engine, with a current just large enough to give a slight angle of steering to the aforesaid rear wheels in the plus and minus directions one after another, and then to examine whether or not there is any abnormality by comparing the magnitude and direction of the current at this juncture and the value detected by the aforesaid displacement sensor.

Also, a rotational angle sensor may be additionally provided to detect the rotational angle of the aforesaid motor, and aforesaid controller may have a third function, in lace of the second function or in cooperation with the second function. This third function is to energize the electric motor with a current which is small enough not to give any large steering angle to the rear wheels when the vehicle velocity exceeds slightly a predetermined value, and to judge that there is no abnormality in the first function and clutch if the rotation of the electric motor based on this current is detected by the aforesaid rotational angle sensor.

The function of the four-wheel steering apparatus structured as above according to the present invention is described generally below.

When the vehicle travels at a speed lower than a predetermined velocity, the controller causes the clutch to be connected by the first function, and at the same time, controls the energizing of the electric motor in accordance with the signals from the steering angle sensor and vehicle velocity sensor for the provision of a desired steering angle to the rear wheel as required.

Also, when the vehicle travels at a speed exceeding a predetermined velocity, the controller causes the clutch to be disconnected by the first function, and provides the state that the provision of the steering angle to the rear wheels is not performed by the electric motor, irrespective of the signals from the steering angle sensor and vehicle velocity sensor.

Thus, if the vehicle changes lanes in traveling at a speed exceeding a predetermined velocity, the steering angle is given to the rear wheels at the same phase for the front wheels on the basis of centrifugal force, so that the stability of the vehicle is maintained at the time of such lane changing.

The mechanism needed for suspending the provision of steering angle by the electric motor when the vehicle travels at a speed exceeding a predetermined velocity can be a simple one, and not only it is possible to obtain the sufficient reliability of such mechanism, but it is also possible to make the fail-safe mechanism associated therewith simple and highly reliable.

Also, in the case of the four-wheel steering apparatus of the present invention, by the second function of the controller, a current large enough to give a slight steering angle to the rear wheels is charged to the electric motor in a short period, immediately after the actuation of the engine, in the plus and minus directions one after another. As a result, if there is no abnormality, a slight steering angle is given to the rear wheels. The amount of the displacement related to this steering angle is detected by the displacement sensor. Then, the aforesaid controller judges whether or not there is any abnormality by comparing the size and direction of the aforesaid current and the value detected by the aforesaid displacement sensor. If any abnormality is found as a result of this judgement, the energizing of the electric motor is suspended completely, for example, so that the provision of steering angle to the rear wheels is not allowed to be given by the rotation of the electric motor.

Further, in the case of the four-wheel steering apparatus of the present invention, a current which is small enough not to give any large steering angle to the rear wheels is charged to the electric motor by the third function of the controller when the vehicle velocity exceeds a predetermined value slightly. In the case where the vehicle velocity exceeds a predetermined value, if the first function of the controller functions normally and the clutch also works normally, the torque required to rotate the electric motor is small because the clutch is disconnected. Therefore, even if the current charged to this electric motor is small, the motor is caused to rotate. On the other hand, if the aforesaid first function does not work normally or the clutch is not disconnected due to burn out or the like, the torque required to rotate the electric motor is great, and the electric motor can not be rotated at al or can only be rotated slightly by the small current to be given thereto. Therefore, when the aforesaid rational angle sensor detects the rotation of the electric motor in response to the charge of the aforesaid current, the controller judges that the first function and clutch are in the normal condition. If the controller judges that there is an abnormality in this respect, the energizing of the electric motor is completely suspended, for example, and any provision of steering angle to the rear wheels is not performed on the basis of the rotation of the electric motor.

Further, the four-wheel steering apparatus of the present invention may have a steering angle sensor for detecting the steering angles given to the front wheels; a rear-wheel output shaft for providing the rear wheels with the steering angles by displacing in the axial direction; an electric motor for displacing this rear-wheel output shaft in the axial direction; a vehicle velocity sensor for detecting the vehicle velocity; a clutch which may be electrically connected or disconnected between the rotational driving shaft of the aforesaid electric motor and the aforesaid rear-wheel output shaft; a displacement sensor for detecting the steering angles given to the rear wheels on the basis of the displacement of the aforesaid rear-wheel output shaft; and a controller for controlling the energy to the aforesaid electric motor and the connection and disconnection of the aforesaid clutch.

In addition, the structure is arranged so as to position the steering center of the aforesaid rear wheels backward from the point of the force applied, as considered in the advancing direction of the vehicle, and to support the aforesaid rear-wheel output shaft resiliently with a slight freedom of displacement in the axial direction with respect to the vehicle body.

The aforesaid controller has a first function to connect the aforesaid clutch only when the vehicle velocity detected by the aforesaid vehicle velocity sensor is lower than a predetermined value.

The aforesaid controller has in addition to the aforesaid first function, a fourth function to reduce the steering angle gradually when the temperature of the electric motor, obtained by a detection means, exceeds a predetermined value while the rear wheels are provided with the steering angle.

Further, the aforesaid controller may have, in place of the aforesaid. fourth function or in addition to the fourth function, a fifth function to reduce the steering angle if the rear wheels are provided with the steering angle after the elapse of a predetermined time subsequent to the vehicle velocity having become zero.

The function of the four-wheel steering apparatus structured as above according to the present invention is described generally below.

When the vehicle travels at a speed lower than a predetermined velocity, the controller causes the clutch to be connected and at the same time, controls the energizing of the electric motor in accordance with the signals from the steering angle sensor and vehicle velocity sensor for the provision of a desired steering angle to the rear wheel as required.

Also, when the vehicle travels at a speed exceeding a predetermined velocity, the controller causes the clutch to be disconnected, and provides the state that the provision of the steering angle to the rear wheels is not performed by the electric motor, irrespective of the signals from the steering angle sensor and vehicle velocity sensor.

Thus, if the vehicle changes lanes in traveling at a speed exceeding a predetermined velocity, the steering angle is given to the rear wheels at the same phase for the front wheels on the basis of centrifugal force, so that the stability of the vehicle is maintained at the time of such lane changing.

The mechanism needed for suspending the provision of steering angle by the electric motor when the vehicle travels at a speed exceeding a predetermined velocity can be a simple one, and not only it is possible to obtain the sufficient reliability of such mechanism, but it is also possible to make the fail-safe mechanism associated therewith simple and highly reliable.

Also, in the case of the four-wheel steering apparatus of the present invention, while the rear wheels are provided with a steering angle, if the temperature of the electric motor exceeds a predetermined value, this steering angle is gradually reduced by the fourth function of the controller to enable the rear wheels reach a state where no steering angle is provided therefor ultimately.

In the case where no steering angle is given to the rear wheels, it is unnecessary to energize the electric motor. Therefore, any excessive consumption of electric power is saved, and the burn out of electric motor or any possible trouble occurring in the battery can be prevented.

Further, in the case of the four-wheel steering apparatus of the present invention, if the rear wheels are provided with a steering angle after the elapse of a predetermined time subsequent to the vehicle velocity having become zero, this steering angle is also gradually reduced by the fifth function of the controller to bring the rear wheels to a state where no steering angle is provided therefor thus making it possible to prevent the burn out of the electric motor or any possible trouble to occur in the battery.

BRIEF DESCRIPTION OF THE DRAWINGS

FIG. 1 through FIG. 4 are views showing an embodiment of the four-wheel steering apparatus according to the present invention;

DESCRIPTION OF THE PREFERRED EMBODIMENTS

FIG. 1 through FIG. 4 are views showing an embodiment of the four-wheel steering apparatus according to the present invention.

When the steering wheel 1 provided in the driver's seat is operated, its movement is transmitted to the steering gear 3 through the steering shaft 2 to displace the front-wheel output shaft 4 in the axial direction (the left and right directions in FIG. 1), and a desired steering angle is given to the front wheels 6 and 6 through a pair of left and right knuckle arms 5 and 5 coupled to both ends of the aforesaid front-wheel output shaft 4 respectively.

Figure 1:
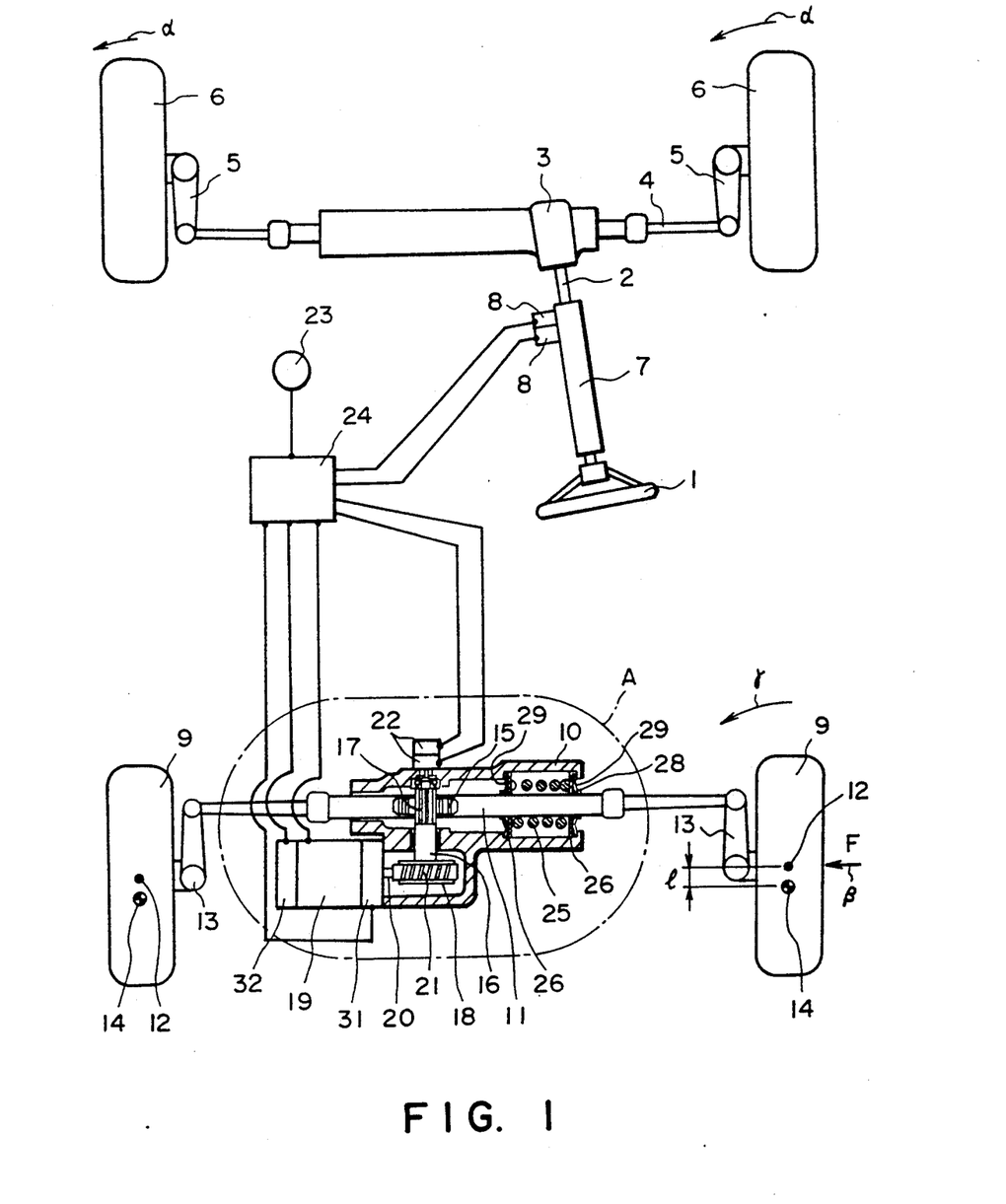
FIG. 1 is a partially cross-sectional plan view showing the entire structure.

On the steering column 7 through which the aforesaid steering shaft 2 is installed, steering angle sensors 8 and 8 are supported to detect the steering angles provided for the front wheels 6 and 6 by detecting the rotational angles of the steering shaft 2. In this respect, the reason why two steering angle sensors 8 and 8 are provided is that even if one of the steering angle sensors 8 fails, a desired control can be executed by the other, thereby implementing the fail-safe required.

Figure 2:
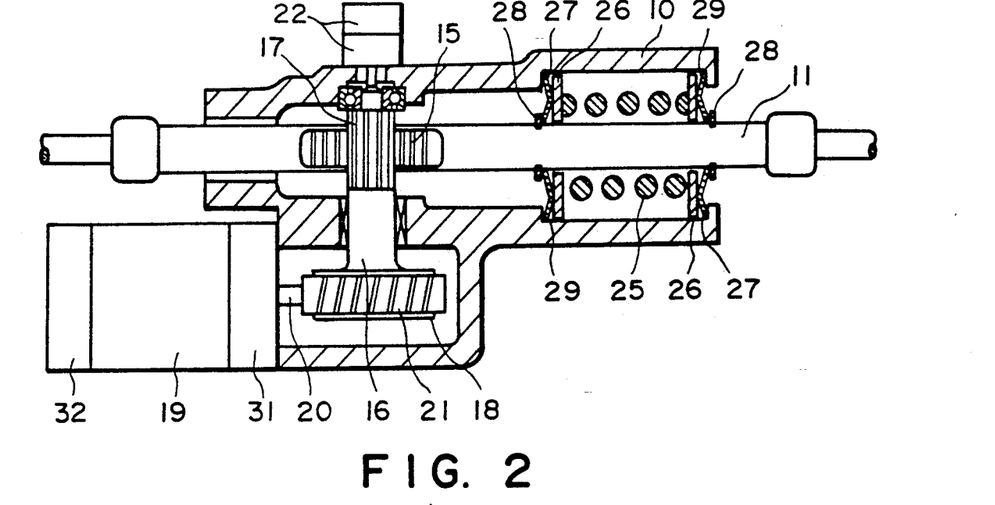
FIG. 2 is an enlargement of the section A of FIG. 1.

Also, on the rear floor surface, a housing 10 is supported to accommodate the mechanism to give steering angles to the rear wheels 9 and 9 in such a manner that the housing cannot be displaced in the width direction of the vehicle (in the left and right directions in FIG. 1 and FIG. 2). Through the inside of this housing 10 the rear-wheel output shaft 11 is provided along the left and right directions (the width direction of the vehicle). This rear-wheel output shaft 11 provides steering angles for the rear wheels 9 and 9 by displacing in the axial direction (the left and right directions), and the rear wheels 9 and 9 and the left and right side ends of the rear-wheel output shaft 11 are coupled respectively by the knuckle arms 13 and 13. As the aforesaid rear-wheel output shaft 11 is displaced in the axial direction, each of the rear wheels 9 and 9 is rocked with a respective one of the steering centers 14 and 14 as its center, so that a steering angle corresponding to the displacement amount of the aforesaid rear-wheel output shaft 11 is given to each of the rear wheels 9 and 9. Also, the steering centers 14 and 14 of the rear wheels 9 and 9 are positioned backward (toward the lower part in FIG. 1) from the point of forces applied 12 and 12 (the center of the contact face between the bottom of tire and the ground) of each of the rear wheels 9 and 9 by a distance I in the longitudinal direction (the vertical direction in FIG. 1).

A rack 15 is fixed on the intermediate section of the aforesaid rear-wheel shaft 11, which is located in the aforesaid housing 10. Also, a pinion gear 17 is fixed to the one end of the transmission shaft 16 (the upper end in FIG. 1 and FIG. 2) which is rotatively supported in the aforesaid housing 10 with a helically positional relationship to the aforesaid rear-wheel output shaft 11, and this pinion gear 17 is arranged to engage with the aforesaid rack 15. Also, on the other end of the aforesaid transmission shaft 16 (the lower end in FIG. 1 and FIG. 2), a worm wheel 18 is fixed.

A worm 21 is fixed to the output shaft 20 driven of rotation by the rotational shaft (not shown) of an electric motor 19 fixed on the outer surface of the aforesaid housing 10. The shaft 20 is driven electromagnetic clutch 31, and by the engagement of worm 21 with the aforesaid worm wheel 18, a speed reducing mechanism is constituted to displace the aforesaid rear-wheel output shaft 11 in the axial direction by the rotation of the aforesaid output shaft 20. This speed reducing mechanism has reversibility in the power transmission direction. This mechanism not only displaces the rear-wheel output shaft 11 in the axial direction but causes the aforesaid output shaft 20 to rotate following the displacement of the rear-wheel output shaft 11 in the axial direction. However, by restricting the reversibility factor of the aforesaid speed reducing mechanism to a low level, care is taken so as not to allow the load of the centering spring 25, which will be described later, to be exerted upon the aforesaid electric motor 19. Also, a rotational angle sensor 32 is additionally provided for the electric motor 19 to detect the rotational angle of the electric motor 19, and this value is inputted into a controller 24 which will be described subsequently.

At the one end of the aforesaid transmission shaft 16, two displacement sensors 22 and 22 are provided to detect the displacement amount of the aforesaid rear-wheel output shaft 11 through the transmission shaft 16. The detection signals transmitted from these two displacement sensors 22 and 22 are inputted into the controller 24 to control the energizing of the aforesaid motor 19 together with the detection signals from the aforesaid steering angle sensors 8 and 8 and the detection signals from a vehicle velocity sensor 23 to detect the vehicle velocity. In this respect, the reason why two of the aforesaid displacement sensors 22 and 22 are provided is also to implement the fail-safe.

The aforesaid controller 24 serves, as its first function, to connect the aforesaid electromagnetic clutch 31 only when the vehicle velocity detected by the aforesaid vehicle velocity sensor 23 is lower than a predetermined value (for example, 40 km/h), and to provide a steering angle to the rear wheels 9 and 9 by the aforesaid electric motor 19 on the basis of the signals from the aforesaid steering angle sensors 8 and 8 and vehicle velocity sensor 23. At this juncture, the controller controls the energizing of the aforesaid electric motor 19 on the basis of the signals from the rotational angle sensor 32. Also, the displacement sensors 22 and 22 mounted at the one end of the transmission shaft 16 detect the steering angle actually given to the rear wheels 9 and 9 and input the detection value into the aforesaid controller 24.

Also, the aforesaid controller 24 has a function to disconnect the aforesaid electromagnetic clutch 31 after having shifted the aforesaid rear-wheel output shaft 11 toward the neutral position gradually by rotating the electric motor 19 at a low speed while the aforesaid clutch 31 is still connected. This function is performed if an abnormality is detected by the signals from each of the sensors 8, 22, 23, and 32 when the vehicle velocity is lower than a predetermined value.

The aforesaid rear-wheel output shaft 11 is resiliently supported with a slight freedom of displacement in the axial direction (the left and right directions in FIG. 1 and FIG. 2) with respect to the housing 10 fixed on the vehicle body. A pair of washer plates 26 and 26 are fitted from the outside apart from each other on the intermediate section of the aforesaid rear-wheel output shaft 11 and supported to be freely displaceable over the axial direction of the rear-wheel output shaft 11. Also, there is provided in the space between the inner faces of the washer plates 26 and 26, the centering spring 25 having a resiliency enough to enable the aforesaid rear-wheel shaft 11 to be returned to the neutral position at the time of any possible failure of the aforesaid electric motor 19. Further, in the inner periphery of the aforesaid housing 10, a pair of staged portions 27 and 27 are formed, and the outer circumferential portions of the outer peripheries of the aforesaid pair of washer plates 26 and 26 are arranged to face the staged portions 27 and 27 respectively. On the outer periphery of the intermediate section of the aforesaid rear-wheel output shaft 11, a pair of stop rings 28 and 28 are fixedly mounted to restrict the shifting of each of the washer plates 26 and 26 with respect to the rear-wheel output shaft 11. Further, between the outer side faces of the aforesaid pair of washer plates 26 and 26, staged portions 27 and 27, and stop rings 28 and 28, disc springs 29 and 29 are provided.

Figure 3:
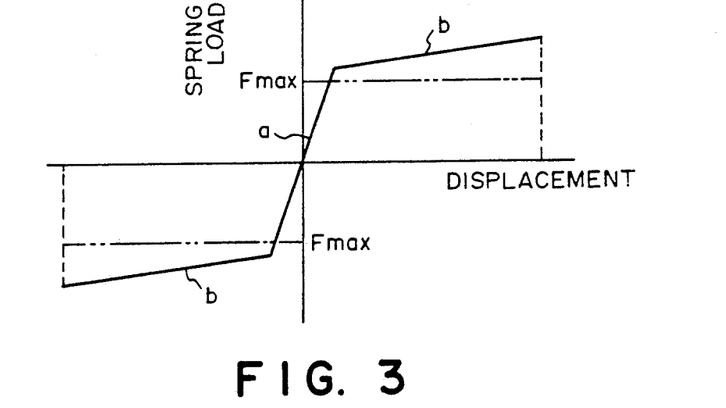
FIG. 3 is a diagram showing the relationship between the displacement of the rear wheel output shaft in the axial direction and the spring load applied to the rear wheel output shaft in the axial direction.

The resiliency of each of the disc springs 29 and 29 is smaller than that of the centering spring 25, and if the rear-wheel output shaft 11 is displaced with respect to the housing 10, the disc springs 29 and 29 are first displaced as represented by a line a in FIG. 3. Then, the arrangement is made so that subsequent to either one of the disc springs 29 (at the leading end of the displacement direction) having been completely flattened by pressure, the aforesaid centering spring 25 begins to be pressed between the pair of the washer plates 26 and 26 as represented by a corresponding line b in FIG. 3. The spring load when each of the disc springs 29 and 29 is completely pressed is slightly larger than the estimated maximum lateral load $F_{MAX}$ exerted on the rear-wheel output shaft 11 on the basis of centrifugal force generated in the expected driving state.

The function of the four-wheel steering apparatus structured as above according to the present invention is given below.

When the vehicle travels at a speed lower than a predetermined velocity (for example, 40 km/h), the controller 24 controls the energizing of the electric motor 19 on the basis of signals from the steering angle sensors 8 and 8 and vehicle velocity sensor 23 and provides the rear wheels 9 and 9 with a desired steering angle as required. At this juncture, the electromagnetic clutch 31 is energized so that it remains in a state of being connected.

In other words, when the vehicle travels at low to medium speeds, a steering angle is given to the rear wheels 9 and 9 at the opposite phase of the steering angle provided for the front wheels 6 and 6 in order to improve the turning capability of the vehicle. However, the steering angles provided for the rear wheels 9 and 9 are made smaller as the vehicle velocity becomes faster as represented by a solid line c in FIG. 4. In this case, the steering angle given to the rear wheels is detected by the displacement sensors 22 and 22 installed at the one end of the transmission shaft 16, and the fall-safe is implemented by inputting the value thus detected into the controller 24.

Figure 4:
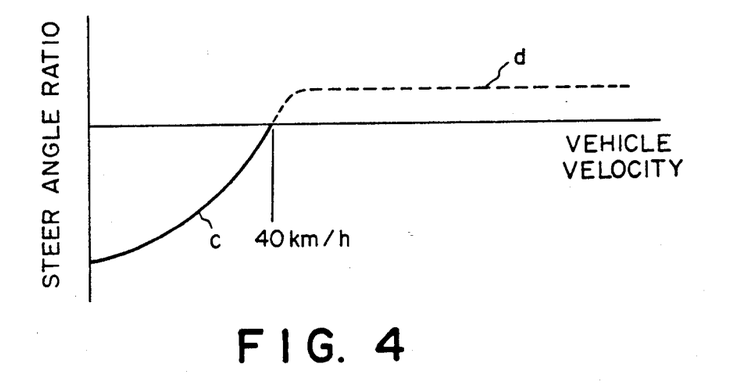
FIG. 4 is a diagram showing the relationship between the vehicle speed and the steering angle ratio.

The steering angle ratio represented by the vertical axis in FIG. 4 is the ratio between a steering angle $\theta_R$ given to the rear wheels and a steering angle $\theta_F$ given to the front wheels ($\theta_R/\theta_F$), which shows that the larger the absolute value, the greater the steering angle given to the rear wheels. As will be appreciated from FIG. 4 in the region above the horizontal axis, the steering angles for the rear and front wheels are of the same phase, and in the region below, these are of the reverse phase.

In a state where the steering angle is provided for the rear wheels 9 and 9 by the electric motor 19, if the provision of the steering angle to the rear wheels 9 and 9 remains unchanged due to some possible trouble, the controller 24 detects such condition by the signals form each of the sensors 8, 22, 23, and 32, and shifts the aforesaid rear-wheel output shaft 11 gradually toward the neutral position by the electric motor 19 while keeping the aforesaid electromagnetic clutch 31 connected. Then, the controller disconnects the aforesaid electromagnetic clutch 31 after the rear wheels 9 and 9 have returned to the neutral position. As a result, the rear wheels 9 and 9 are in a state of being free from any steering angles given thereto, and the vehicle can be driven in the same condition as to the usual driving of a vehicle having a two-wheel steering apparatus.

On the other hand, when the vehicle travels at a speed exceeding a predetermined velocity, the energizing of the aforesaid electromagnetic clutch 31 is suspended to disconnect the electromagnetic clutch 31. As a result, the controller 24 can no longer perform any steering angle controls for the rear wheels 9 and 9, irrespective of the signals from the steering angle sensors 8 and 8 and vehicle velocity sensor 23. Also, if required, the energizing of the electric motor 19 is suspended.

Thus, if the vehicle changes lanes in traveling at a speed exceeding a predetermined velocity, a steering angle is provided for the rear wheel 9 and 9 by centrifugal force at the same phase as the front wheels 6 and 6 thereby to maintain the stability of the vehicle at the time of the lane changing.

For example, if the front wheels 6 and 6 are displaced in the direction indicated by arrow $\alpha$ in FIG. 1 on the basis of the operation of steering wheel 1, the rear wheels 9 and 9 are swung to the right side in FIG. 1 by the centrifugal force accompanying the lane changing of the vehicle, and the lateral force F is given to each of the rear wheels 9 and 9 as indicated by arrow $\beta$ in FIG. 1 by the friction between the ground and each of the rear wheels 9 and 9. This force F is exerted on the contacting face between the rear wheels 9 and 9 and the ground, i.e., the vertical plane including the points 12 and 12 of force applied for each of the rear wheels 9 and 9. Meanwhile, since the steering centers 14 and 14 of the rear wheels 9 and 9 are positioned backward from the aforesaid points 12 and 12 of force applied in the advancing direction of the vehicle by a distance l, each of the rear wheels 9 and 9 is provided with a steering in the direction indicated by arrow $\gamma$ in the FIG. 1 by a moment $F \cdot \lambda$.

Thus, following the steering of each of the rear wheels 9 and 9 in the direction indicated by arrow $\gamma$, the rear-wheel output shaft 11 is displaced in the axial direction and one of the disc springs (on the left side in FIG. 1 and FIG. 2) 29 is pressed. Consequently, the steering angle given to each of the rear wheels 9 and 9 is held in a state that the force exerted in the axial direction of the rear-wheel output shaft 11 on the basis of the aforesaid lateral force F and the force exerted on the rear-wheel output shaft 11 on the basis of the compression of the aforesaid disc spring 29 are well balanced.

As a result, if the vehicle velocity exceeds a predetermined value, the steering angle given to the rear wheels 9 and 9 is always of the same phase as the front wheels as represented by a dashed line d in FIG. 4. Also, in this case, the degree of the steering angle given to the rear wheels 9 and 9 is defined only by the intensity of the lateral force F exerted on the rear wheels 9 and 9 by the centrifugal force accompanying the lane changing of the vehicle, and is not directly related to the vehicle velocity and the steering angle provided for the front wheels 6 and 6 (although significantly related to them indirectly).

Also, the allowable range of compression given to the disc springs 29 and 29 is limited. Accordingly, there is no possibility that any excessively large steering angle is provided for the rear wheels 9 and 9.

As above described, the provision of steering angle to the rear wheels 9 and 9 by the electric motor 19 is not performed at all when the vehicle travels at a speed exceeding a predetermined velocity is but only by physical force, the provision of steering angle to the rear wheels 9 and 9 performed. The mechanism to suspend the energization to the electromagnetic clutch 31 and the electric motor 19 can be a simple one, and it is possible to obtain a sufficient reliability of such mechanism as well as to make the accompanying fail-safe mechanism also simple and highly reliable.

In this respect, in the embodiment shown in FIG. 1, the speed reducing mechanism provided between the electric motor 19 and the rear-wheel output shaft 11 comprises the worm 21 and worm wheel 18 to restrict the reversibility at a low level. Therefore, when a steering angle is given to the rear wheels 9 and 9 by the electric motor 19 in traveling at low to middle speeds and such state is maintained, there is no possibility that the aforesaid electric motor 19 is left with the application of a large charge because of the resiliency of the aforesaid centering spring 25.

Also, in the case of the embodiment shown in FIG. 1, the housing 10 is supported with respect to the vehicle body in such a way that the housing cannot be displaced over the width direction of the vehicle with the disc springs 29 and 29 installed as resilient members between this housing 10 and the rear-wheel output shaft 11. However, the disc springs 29 and 29 between the aforesaid housing 10 and the rear-wheel output shaft 11 may be omitted, and in place thereof, the aforesaid housing 10 may be supported resiliently with respect to the vehicle body to be displaceable in the axial direction of the aforesaid rear-wheel output shaft 11 (the width direction of the vehicle).

Figure 5:
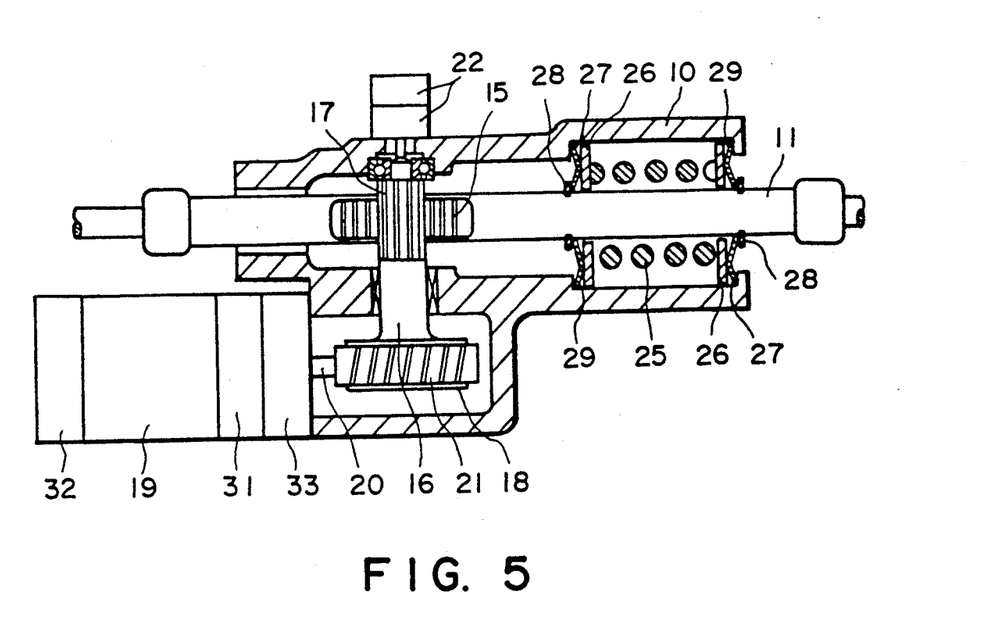
FIG. 5 is a cross-sectional view showing another embodiment of the four-wheel steering apparatus according to the present invention.

FIG. 5 shows another embodiment of the four-wheel steering apparatus according to the present invention.

In the present embodiment, a viscous damper 33 functioning as a damper mechanism is provided between the rotational shaft of the electric motor 19 and the output shaft 20 with a worm 21 fixed thereto. The viscous damper 33 is provided in series with the aforesaid electromagnetic clutch 31, and the viscous damper 33 is positioned closer to the output shaft 20 than the electromagnetic clutch 31 to provide resistance to the rotation of the aforesaid output shaft 20.

Similarly to the previous embodiment, if there is any abnormality, the controller 24 (not shown in FIG. 5, refer to FIG. 1) disconnects the aforesaid electromagnetic clutch 31 immediately by detecting such abnormality by signals from the steering angle sensors 8 and 8 (refer to FIG. 1) to detect the steering angle of the steering shaft 2, the displacement sensors 22 and 22 to detect the displacement amount of the rear-wheel output shaft 11 through the transmission shaft 16, the vehicle velocity sensor 23 (refer to FIG. 1), and the rotational angle sensor 32 to detect the rotational angle of the electric motor 19.

In the case of the present embodiment, if any abnormality is detected in traveling at a low speed and the electromagnetic clutch 31 is disconnected, the rear-wheel output shaft 11 is returned to the neutral position by the resiliency of the centering spring 25 and disc springs 29 and 29 which support this rear-wheel output shaft 11 resiliently with respect to the housing 10 fixed on the vehicle body. As a result, the rear wheels 9 and 9 which are mechanically coupled to the rear-wheel output shaft 11 are returned to the neutral position.

At the time of the rear wheels 9 and 9 thus returning to the neutral position, the transmission shaft 16 is rotated on the basis of the engagement of the rack 15 and pinion gear 17, and further, the output shaft 20 is rotated on the basis of the engagement of the worm wheel 18 and worm 21. The rotation of this output shaft 20 is executed gradually by the function of the viscous damper 33. Accordingly, the displacement of the aforesaid rear-wheel output shaft 11 in the axial direction is also executed gradually, hence making it possible to eliminate the unnaturalness that may accompany the sudden removal of the steering angle provided for the rear wheels 9 and 9.

Figure 6:
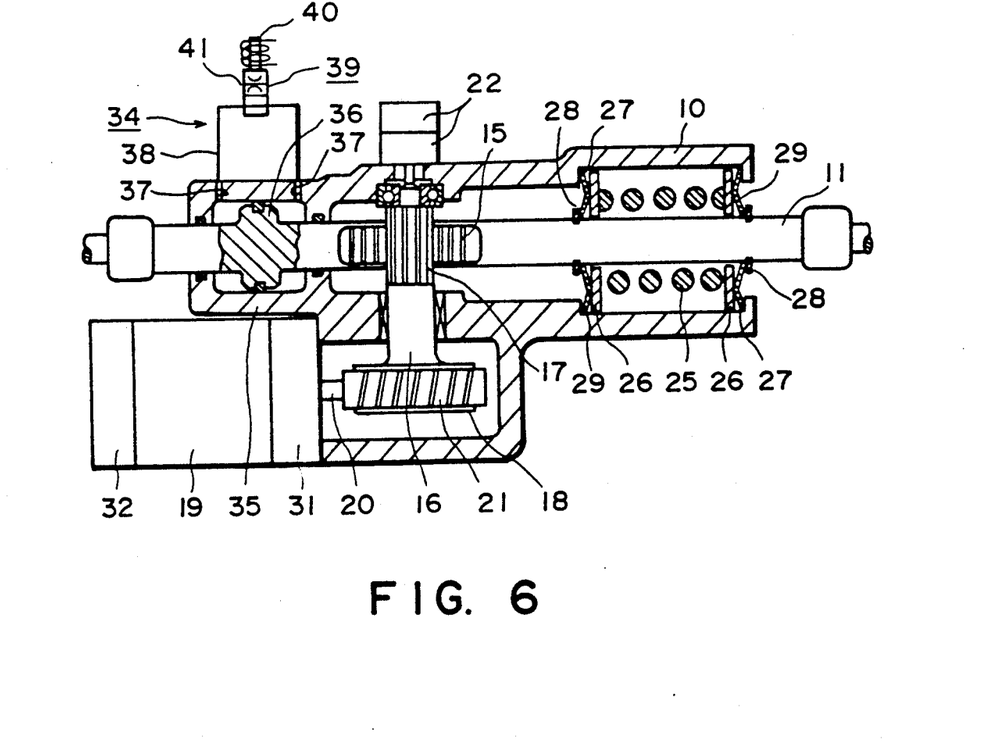
FIG. 6 is a cross-sectional view showing still another embodiment of the four-wheel steering apparatus according to the present invention.

FIG. 6 shows still another embodiment of the four-wheel steering apparatus according to the present invention.

In the present embodiment, a viscous damper 34 functioning as a damper mechanism is provided between the housing 10 fixed on the vehicle body and the rear-wheel output shaft 11 supported to be displaceable in the axial direction with respect to this housing 10.

More particularly, a cylinder portion 35 with viscous oil sealed therein is installed at one end (the extreme left side in FIG. 6) of the aforesaid housing 10 and at the same time, a piston portion 36 provided in the intermediate section of the rear-wheel output shaft 11 is fittingly mounted in the aforesaid cylinder portion 35 in an oiltight fashion. The supply and exhaust ports 37 and 37 provided at both ends of the aforesaid cylinder portion 35 respectively are connected with each other by an oil supply tube 38, and in the intermediate section of this oil supply tube 38, a flow adjustment valve 39 is installed.

This flow adjustment valve 39 adjusts the flow of the viscous oil in the aforesaid oil supply tube 38 by the presence of the charge to a solenoid 40. If, for example, there is no charge to the solenoid 40, the amount of the viscous oil flowing in the oil supply tube 38 is not reduced. On the other hand, if the solenoid 40 is energized, the throttle nozzle 41 which is arranged in series with the aforesaid oil supply tube 38 is separated to reduce the amount of the viscous oil flowing in the aforesaid oil supply tube 38.

If the controller 24 (not shown in FIG. 6, refer to FIG. 1) detects any abnormality in the four-wheel steering apparatus by the signals from the steering angle sensor 8 and 8 (refer to FIG. 1) to detect the rotational angle of the steering shaft 2, the displacement sensors 22 and 22 to detect the displacement amount of the rear-wheel output shaft 11 through the transmission shaft 16, the vehicle velocity sensor 23 (refer to FIG. 1) and the rotational angle sensor 32 to detect the rotational angle of the electric motor 19, the controller functions to disconnect the aforesaid electromagnetic clutch 31 immediately and at the same time, begins to energize the solenoid 40 (which has been in a state of being de-energized) so that the amount of the viscous oil flowing in the oil supply tube 38 is reduced.

In the present embodiment, when the vehicle travels at a low speed, if any abnormality is detected and the electromagnetic clutch 31 is disconnected, the rear-wheel output shaft 11 is returned to the neutral position by the resiliency of the centering spring 25 and disc springs 29 and 29 which support this rear-wheel output shaft 11 resiliently with respect to the housing 10 fixed on the vehicle body. Consequently, the rear wheels 9 and 9 which are mechanically coupled to the rear-wheel output shaft 11 are returned to the neutral position.

At the time of the rear wheels 9 and 9 thus returning to the neutral position, the piston portion 36 fixed in the rear-wheel output shaft 11 is displaced in the cylinder portion 35 provided in the housing 10 fixed to the vehicle body. Accompanying the displacement of the piston portion 36, the viscous oil sealed in the cylinder portion 35 flows in the oil supply tube 38, but at this juncture, its amount flowing through the flow adjustment valve 39 is reduced because the solenoid 40 is energized. Therefore, the displacement of the aforesaid rear-wheel shaft 11 is performed gradually. As a result, the steering angle provided for the rear wheels 9 and 9 is also removed gradually, hence making it possible to eliminate any unnaturalness resulting from the sudden removal of the steering angle.

On the other hand, in the usual state where no trouble occurs, the aforesaid flow adjustment valve 39 is switched to allow a sufficient amount of the viscous oil to pass with the solenoid 40 having been de-energized. Accordingly, there is no possibility that the resistance against the displacement of the aforesaid rear-wheel output shaft 11 becomes unnecessarily great. Therefore, it is possible to provide the rear wheels 9 and 9 with a steering angle rapidly with an electric motor, the output of which is not particularly large as the electric motor 19.

The four-wheel steering apparatus according to the present embodiment is structured to perform its function as set forth above, which makes it possible to provide the rear wheels with an optimum steering angle depending on the situation, and with a comparatively simple fail-safe mechanism, it is possible to secure a sufficient safety.

Also, if a trouble occurs in traveling at a low speed, the steering angle given to the rear wheels is released to make a stable driving possible.

Further, in still another embodiment, the controller 24 has an additional function to suspend energizing the electric motor 19 completely if an abnormality is detected by the signals from the aforesaid sensors 8, 22, 23, and 32, so that no steering angle is given to the rear wheels 9 and 9 by the rotation of the aforesaid electric motor 19.

A second function is provided to judge whether or not the four-wheel steering apparatus of the present invention is ready for its actual operation. More particularly, the controller 24 energizes the aforesaid electric motor 19 with current (time) in plus and minus directions in a short period immediately after the engine has been started. The intensity or magnitude of this current is just strong enough to give a slight steering angle to the rear wheels 9 and 9 in either plus and minus directions. Also, in order to judge whether or not the electric motor 19 has a sufficient output, it is desirable to make such intensity strong enough to enable not only the aforesaid disc spring 29 but also the aforesaid centering spring 25 to be slightly pressed. Then, the presence of any abnormality is judged by comparing the intensity and direction of the aforesaid current in the plus and minus directions and the detected value of the aforesaid displacement sensors 22 and 22.

The third function is provided to verify that the electromagnetic clutch 31 is disconnected when the vehicle velocity exceeds a predetermined value. More particularly, the controller 24 energizes the aforesaid electric motor 19 with a current which is not so strong as to give a large steering angle to the rear wheels 9 and 9, i.e., its intensity is not large enough to cause the aforesaid centering spring 25 to be pressed at the largest, and should not desirably be large enough to allow the aforesaid disc springs 29 and 29 to be pressed, when the vehicle velocity becomes a speed (for example, 50 km/h) which slightly exceeds (for example, by 10 km/h) the aforesaid predetermined value (40 km/h). At the same time, the aforesaid controller 24 observes the signals from the aforesaid rotational angle sensor 32 and judges that there is no abnormality in the first function of the controller 24 itself and the electromagnetic clutch 31 when the aforesaid motor 19 is rotated on the basis of the aforesaid current.

In the case of the present embodiment of the four-wheel steering apparatus, the reliability of the apparatus is further enhanced because the operational condition of the four-wheel steering apparatus is often checked in a secure state by the second and third functions of the controller 24.

As noted above, according to the second function, the controller 24 energizes the aforesaid electric motor 19 with a current, the intensity of which is just enough to provide the rear wheels 9 and 9 with a slight steering angle, in the plus and minus directions one after another in time sequence in a short period immediately after the engine has been started. Then, if there is no abnormality, the rear wheels 9 and 9 are provided with a slight steering angle in either direction, and the displacement amount related to this steering angle is obtained by the aforesaid displacement sensors 22 and 22. Thus, the aforesaid controller 24 judges the presence of abnormality by comparing the magnitude and direction of the aforesaid current and the detected value from the aforesaid displacement sensors 22 and 22. As a result, if any abnormality is present according to the judgment, the energizing of the electric motor 19 is completely suspended, for example, and the steering angle provision to the rear wheels 9 and 9 is not allowed to be performed on the basis of the rotation of the electric motor 19. In such state, the steering of the vehicle is performed the same as a vehicle having the usual two-wheel steering apparatus.

In this way, the judgment by the second function is made immediately after the engine has been started. Therefore, the vehicle is still at rest or at an extremely low speed if the vehicle travels, and there is no inconvenience in driving the vehicle even if a slight steering angle is given to each of the rear wheels 9 and 9 without any relations to the operation of the steering wheel 1. In this case, the rear wheels 9 and 9 are returned to the neutral position or the position corresponding to the steering angle of the front wheels 6 and 6 after the judgment has been made.

As also noted above, according to the third function, the controller, 24 energizes the aforesaid electric motor 19 with a current, the intensity of which is not large enough (is small so as not) to press the aforesaid disc springs 29 and 29 and provide the rear wheels 9 and 9 with the steering angle when the vehicle velocity becomes a speed (50 km/h, for example) which slightly exceeds a predetermined velocity (40 km/h, for example).

When the vehicle velocity exceeds a predetermined value, the torque required for the aforesaid electric motor 19 to rotate should be small because the electromagnetic clutch 31 is disconnected if the first function of the controller 24 as well as the electromagnetic clutch 31 is normally operated. Therefore, even if the current to the aforesaid electric motor 19 is small, this electric motor 19 is allowed to rotate. On the other hand, if the aforesaid first function does not work normally or the electromagnetic clutch 31 is burnt to cause this electromagnetic clutch 31 to remain connected, the torque required for the aforesaid motor 19 to rotate becomes great (at least great enough to press one of the disc spring 29). Therefore, with the small current charged to the electric motor 19, it is impossible to enable this electric motor 19 to be rotated.

Accordingly, as the third function, the aforesaid controller 24 judges that there is no abnormality in its first function and the electromagnetic clutch 31 if the rotation of the electric motor 19 on the basis of the aforesaid small current is detected by the aforesaid rotational angle sensor 32.

If any abnormality is present according to such judgment, the controller suspends energizing the electric motor 19 completely, for example, as in the case of the abnormality found on the basis of the judgment by the second function, so that any provision of steering angle to the rear wheels 9 and 9 is not performed by the rotation of this electric motor 19.

The four-wheel steering apparatus embodying the present invention is structured to function as set forth above thereby making it possible to provide an optimum steering angle to the rear wheels depending on the situation, and further, with the provision of a comparatively simple fail-safe mechanism to secure sufficient safety.

Also, if a trouble occurs, such trouble can be detected quickly to make a stable operation possible.

Further, in still another embodiment, the aforesaid controller 24 serves to prevent the aforesaid electric motor 19 from being energized continuously for a long time. For this purpose the controller may have one or both of fourth and fifth functions in addition to the aforesaid first function.

In order to perform the fourth function a detecting means (not shown) for obtaining the thermal generation of the aforesaid electric motor 19 is provided in the case of the four-wheel steering apparatus of the present invention. For a detecting means such as this, it may be possible to employ, for example, a temperature sensor for detecting the thermal generation of the power transistor for controlling the electric motor 19, or further, an ammeter for measuring the energization (integration of current by time) to the aforesaid electric motor 19 in addition to a temperature sensor which detects the thermal generation of the electric motor 19 directly.

Figure 7:
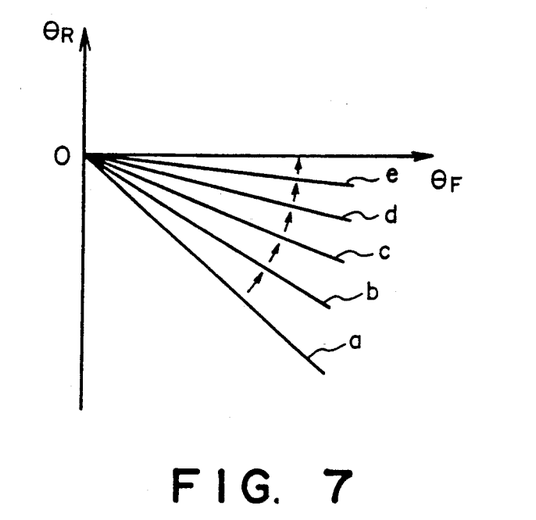
FIG. 7 is a diagram showing the state where the steering angle provided for the rear wheel is gradually becoming smaller.

In the four-wheel steering apparatus of the present invention, while a detecting means such as above is provided, the controller 24 has a fourth function to reduce gradually a steering angle, if any, provided for the rear wheels 9 and 9 at the time of the temperature of the electric motor 19 obtained by the detecting means exceeding a predetermined value. More particularly, if the temperature obtained by the aforesaid detecting means exceeds a predetermined value, the steering angle $\theta_R$ given to the rear wheels 9 and 9 is reduced gradually as indicated by arrows in FIG. 7 from a solid line (a), to (e) through (b), (c), and (d), and lastly the steering angle to the rear wheels 9 and 9 is made zero.

Further, the controller 24 has a fifth function to reduce a steering angle gradually as shown in FIG. 5 if any steering angle is still provided with the rear wheels 9 and 9 after the elapse of a predetermined time (two minutes, for example) subsequent to the vehicle velocity having reached zero level.

In the case of the present embodiment of the four-wheel steering apparatus, it is possible to present burn out of the electric motor 19 and any trouble occurring in the battery with the fourth and fifth functions of the controller 24.

With the fourth function of the controller 24, it is possible to reduce gradually a steering angle, if any, provided for the rear wheels 9 and 9 when the temperature of the aforesaid electric motor 19 exceeds a predetermined value, and to bring the rear wheels 9 and 9 to a state where no steering angle is provided ultimately.

Figure 8:
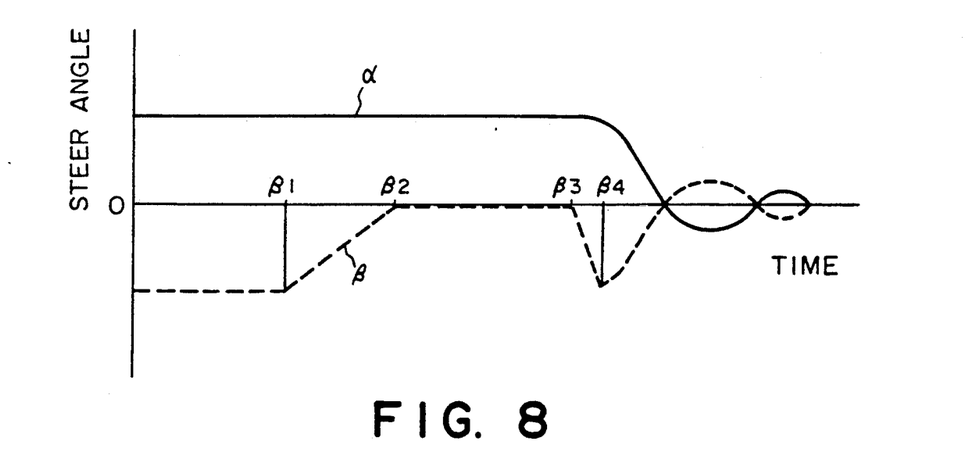
FIG. 8 is a diagram showing the relationship between the steering angle provided for the front wheel and the steering angle provided for the rear wheel with the elapse of time.

For example, as shown by a solid line $\alpha$ in FIG. 8, a steering angle is provided for the front wheels 6 and 6, and as shown by a dashed line $\beta$ in FIG. 8, a steering angle is given to the rear wheels 9 and 9. Then, if a time elapses in such state so that the temperature of the electric motor 19 rises, the aforesaid controller 24 serves with its fourth function to reduce the steering angle given to the rear wheels gradually as shown by the inclined portion of the dashed line from $\beta_1$ to $\beta_2$ and bring the rear wheels 9 and 9 to a state where no steering angle is given thereto.

In a state where no steering angle is given to the rear wheels 9 and 9, i.e., the rear-wheel output shaft 11 is in the neutral position, there is no need of energizing the aforesaid electric motor 19 because the shaft is supported by the resiliency of the centering spring 25 and the disc springs 29 and 29. As a result, any excessive consumption of electric power is controlled to prevent burn out of the aforesaid electric motor 19 and any trouble occurring in the battery.

As shown by a dashed line from $\beta_2-\beta_3$ in FIG. 8, when a time elapses while no steering angle is given to the rear wheels 9 and 9 and the temperature of the electric motor 19 is lowered, the provision of the steering angle therefor is resumed as shown by a dashed line from $\beta_3-\beta_4$.

In this case, however, it is desirable not to begin energizing the electric motor 19 even if the temperature of the electric motor 19 has been lowered while the vehicle is at rest for saving the electric power consumption. Therefore, it may be possible to arrange the structure so that the provision of the steering angle to the rear wheels 9 and 9 can be resumed only when the temperature of the electric motor 19 is lowered and further, an operation related to the departure of the vehicle occurs, such as the accelerator being depressed or the steering wheel 1 being operated subsequent to the cancellation of the steering angle provided for the rear wheels 9 and 9 due to the temperature rise of the electric motor 19.

Further, the aforesaid controller 24 serves according to its fifth function, to reduce gradually (and ultimately to neutral) a steering angle, if any, provided for the rear wheels 9 and 9 after the elapse of a predetermined time (two minutes, for example) subsequent to the vehicle velocity detected by the vehicle velocity sensor 23 having reached the zero level. This prevents any trouble occurring in the battery more assuredly.

The four-wheel steering apparatus of the present invention is structured to function as set forth above to make it possible to provide an optimum steering angle for the rear wheels depending on the situation, and to secure a sufficient safety with the provision of a comparatively simple fail-safe mechanism.

Also, the electric motor is not left with the current being charged over a long time, thus making it possible to avoid excessive consumption of electric power as well as to prevent burn out of the electric motor and the occurrence of trouble in the battery.

What is claimed is:

1. A four-wheel steering apparatus of a vehicle having front and rear wheels, comprising:

a steering angle sensor for detecting the steering angle provided for the front wheels;

a rear-wheel output shaft for providing the rear wheels with a steering angle by displacement in an axial direction;

an electric motor for displacing said rear-wheel output shaft in the axial direction through a speed-reducing mechanism;

a vehicle velocity sensor for detecting the velocity of the vehicle; and a controller for controlling said electric motor on the basis of signals from said steering angle sensor and said vehicle velocity sensor; and wherein said controller energizes said electric motor to effect steering of said rear wheels through said rear-wheel output shaft only when the vehicle velocity detected by said vehicle velocity sensor is lower than a predetermined velocity; said speed-reducing mechanism is reversible; and the steering centers of said rear wheels are positioned rearwardly from respective points of force applied to the rear wheels at the ground, with said rear-wheel output shaft being supported resiliently with respect to a body of the vehicle with a slight freedom of displacement in the axial direction, such that said rear wheels effect compliance steering when the vehicle velocity is above said predetermined velocity.

2. The four-wheel steering apparatus of claim 1, wherein said rear-wheel output shaft is resiliently supported with respect to the vehicle body by a resilient member provided between the rear-wheel output shaft and a housing in which the rear-wheel output shaft is inserted and which is supported on the vehicle body in such a manner that it is non-displaceable in the width direction of the vehicle.

3. The four-wheel steering apparatus of claim 2, wherein
a centering spring for returning said rear-wheel output shaft to a neutral position is provided between respective inner faces of a pair of washer plates which are freely fitted on an intermediate section of the rear-wheel output shaft, disc springs having resiliency smaller than said centering spring are provided as resilient members between outer faces of said pair of washer plates and staged portions formed on the inner circumference of said housing, and stop springs fastened on the outer periphery of said rear-wheel output shaft are provided to hold said discs rings against said washer plates.

4. The four-wheel steering apparatus of claim 1, wherein
said rear-wheel output shaft is resiliently supported with respect to the vehicle body by a housing in which said rear-wheel output shaft is received, with a centering spring being provided to act between said rear-wheel output shaft and said housing, and with said housing being supported on the vehicle body through a resilient member having resiliency smaller than that of said centering spring such that said housing is displaceable in the width direction of the vehicle.

5. The four-wheel steering apparatus of claim 1, wherein
the reversing efficiency of the speed-reducing mechanism is restricted by a worm and worm wheel incorporated in the speed-reducing mechanism.

6. A four-wheel steering apparatus of a vehicle having front and rear wheels, comprising:
a steering angle sensor for detecting the steering angle provided for the front wheels;
a rear-wheel output shaft for providing the rear wheels with a steering angle by displacement in an axial direction;
an electric motor for displacing said rear-wheel output shaft in the axial direction;
a vehicle velocity sensor for detecting the vehicle velocity;
a clutch electrically operable to be mechanically connected and disconnected between a rotational shaft of said electric motor and said rear-wheel output shaft;
a displacement sensor for detecting the steering angle provided to the rear wheels on the basis of the displacement of said rear-wheel output shaft; and
a controller for controlling said electric motor and the operation of said clutch on the basis of signals from said steering angle sensor and said vehicle velocity sensor; and wherein
said controller operates said clutch to connect said rotational shaft of said electric motor and said rear-wheel output shaft to thereby enable steering of the rear wheels by said electric motor only when the vehicle velocity detected by said vehicle velocity sensor is lower than a predetermined velocity; the steering centers of said rear wheels are positioned rearwardly from respective points of force applied to the rear wheels at the ground, with said rear-wheel output shaft being resiliently supported with respect to a body of the vehicle with a slight freedom of displacement in the axial direction, such that said rear wheels effect compliance steering when the vehicle velocity is above said predetermined velocity; and said controller controls said electric motor and said clutch such that when an abnormality is indicated by the signals from said sensors in a case where the vehicle velocity is lower than said predetermined velocity, said rear-wheel output shaft is gradually brought to a neutral position by said electric motor with said clutch maintained connected, and thereafter said clutch is disconnected.

7. A four-wheel steering apparatus of a vehicle having front and rear wheels, comprising:
a steering angle sensor for detecting the steering angle provided for the front wheels;
a rear-wheel output shaft for providing the rear wheels with a steering angle by displacement in an axial direction;
an electric motor for displacing said rear-wheel output shaft in the axial direction;
a vehicle velocity sensor for detecting the vehicle velocity;
a clutch electrically operable to be mechanically connected and disconnected between a rotational shaft of said electric motor and said rear-wheel output shaft;
a displacement sensor for detecting the steering angle provided to the rear wheels on the basis of the displacement of said rear-wheel output shaft;
a controller for controlling said electric motor and the operation of said clutch on the basis of signals from said steering angle sensor and said vehicle velocity sensor; and
a damper mechanism providing resistance to the displacement of said rear-wheel output shaft in the axial direction; and wherein
said controller operates said clutch to connect said rotational shaft of said electric motor and said rear-wheel output shaft to enable steering of the rear wheels by said electric motor only when the vehicle velocity detected by said vehicle velocity sensor is lower than a predetermined velocity; the steering centers of said rear wheels are positioned rearwardly from respective points of force applied to the rear wheels at the ground, with said rear-wheel output shaft being resiliently supported with respect to a body of the vehicle with a slight freedom of displacement in the axial direction, such that said rear wheels effect compliance steering when the vehicle velocity is above said predetermined velocity; and said controller controls said clutch to immediately disconnect said rotational shaft of said electric motor and said rear-wheel output shaft when an abnormality is indicated by the signals from the sensors in a case where the vehicle velocity is lower than said predetermined value.

8. A four-wheel steering apparatus of a vehicle having front and rear wheels, comprising:
a steering angle sensor for detecting the steering angle provided for the front wheels;
a rear-wheel output shaft for providing the rear wheels with a steering angle by displacement in an axial direction;
an electric motor for displacing said rear-wheel output shaft in the axial direction;
a vehicle velocity sensor for detecting the vehicle velocity;
a clutch electrically operable to be mechanically connected and disconnected between a rotational shaft of said electric motor and said rear-wheel output shaft;

a displacement sensor for detecting the steering angle provided to the rear wheels on the basis of the displacement of said rear-wheel output shaft; and a controller for controlling said electric motor and the operation of said clutch on the basis of signals from said steering angle sensor and said vehicle velocity sensor; and wherein said controller has a first function to operate said clutch to connect said rotational shaft of said electric motor and said rear-wheel output shaft to enable steering of the rear wheels by said electric motor only when the vehicle velocity detected by said vehicle velocity sensor is lower than a predetermined velocity; the steering centers of said rear wheels are positioned rearwardly from respective points of force applied to the rear wheels at the ground, with said rear-wheel output shaft being resiliently supported with respect to a body of the vehicle with a slight freedom of displacement in the axial direction, such that said rear wheels effect compliance steering when the vehicle velocity is above said predetermined velocity; and said controller has a second function to judge the presence of an abnormality by energizing said electric motor with a current just large enough to give a steering angle to the rear wheels in positive and negative directions successively in a short period of time immediately after an engine of the vehicle has been started, and by comparing the intensity and direction of the current with the steering angle detected by said displacement sensor.

9. The four-wheel steering apparatus of claim 8, wherein a rotational angle sensor is provided for detecting the rotational angle of said electric motor, and the controller has a third function to judge the presence of an abnormality in the first function or the clutch by energizing the electric motor with a current not large enough to give a large steering angle to the rear wheels when the vehicle velocity slightly exceeds a predetermined value, and by detecting the rotation of the electric motor caused by such current with the rotational angle sensor.

10. A four-wheel steering apparatus of a vehicle having front and rear wheels, comprising:

a steering angle sensor for detecting the steering angle provided for the front wheels;

a rear-wheel output shaft for providing the rear wheels with a steering angle by displacement in an axial direction;

an electric motor for displacing said rear-wheel output shaft in the axial direction;

a vehicle velocity sensor for detecting the vehicle velocity;

a clutch electrically operable to be mechanically connected and disconnected between a rotational shaft of said electric motor and said rear-wheel output shaft;

a displacement sensor for detecting the steering angle provided to the rear wheels on the basis of the displacement of said rear-wheel output shaft;

a controller for controlling said electric motor and the operation of said clutch on the basis of signals from said steering angle sensor and said vehicle velocity sensor; and wherein said controller has a first function to operate said clutch to connect said rotational shaft of said electric motor and said rear-wheel output shaft to enable steering of the rear wheels by said electric motor only when the vehicle velocity detected by said vehicle velocity sensor is lower than a predetermined velocity; the steering centers of said rear wheels are positioned rearwardly from respective points of force applied to the rear wheels at the ground, with said rear-wheel output shaft being resiliently supported with respect to a body of the vehicle with a slight freedom of displacement in the axial direction, such that said rear wheels effect compliance steering when the vehicle velocity is above said predetermined velocity; and said controller has an additional function to reduce the steering angle of the rear wheels gradually fi said thermal detecting means detects that the temperature developed by operation of said electric motor exceeds a predetermined value.

11. The four-wheel steering apparatus of claim 10, wherein said controller has a further function to reduce the steering angle gradually in a case where the rear wheels have a steering angle when the vehicle velocity is zero and a predetermined time has elapsed.

12. A four-wheel steering apparatus of a vehicle having front and rear wheels, comprising:

a steering angle sensor for detecting the steering angle provided for the front wheels;

a rear-wheel output shaft for providing the rear wheels with a steering angle by displacement in an axial direction;

an electric motor for displacing said rear-wheel output shaft in the axial direction;

a vehicle velocity sensor for detecting the vehicle velocity;

a clutch electrically operable to be mechanically connected and disconnected between a rotational shaft of said electric motor and said rear-wheel output shaft;

a rotational angle sensor for detecting the rotational angle of the electric motor;

a displacement sensor for detecting the steering angle provided to the rear wheels on the basis of the displacement of said rear-wheel output shaft;

a controller for controlling said electric motor and the operation of said clutch on the basis of signals from said steering angle sensor and said vehicle velocity sensor; and wherein said controller has a first function to operate said clutch to connect said rotational shaft of said electric motor and said rear-wheel output shaft to enable steering of the rear wheels by said electric motor only when the vehicle velocity detected by said vehicle velocity sensor is lower than a predetermined velocity; the steering centers of said rear wheels are positioned rearwardly from respective points of force applied to the rear wheels at the ground, with said rear-wheel output shaft being resiliently supported with respect to a body of the vehicle with a slight freedom of displacement in the axial direction, such that said rear wheels effect compliance steering when the vehicle velocity is above said predetermined velocity; and said controller has an additional function to judge the presence of an abnormality in the first function or the clutch by energizing the electric motor with a current not large enough to give a large steering angle to the rear wheels when the vehicle velocity slightly exceeds a predetermined value, and by detecting the rotation of the electric motor caused by such current with the rotational angle sensor.

13. A four-wheel steering apparatus of a vehicle having front and rear wheels, comprising:
- a steering angle sensor for detecting the steering angle provided for the front wheels;
- a rear-wheel output shaft for providing the rear wheels with a steering angle by displacement in an axial direction;
- an electric motor for displacing said rear-wheel output shaft in the axial direction;
- a vehicle velocity sensor for detecting the vehicle velocity;
- a clutch electrically operable to be mechanically connected and disconnected between a rotational shaft of said electric motor and said rear-wheel output shaft;
- a rotational angle sensor for detecting the rotational angle of the electric motor;
- a displacement sensor for detecting the steering angle provided to the rear wheels on the basis of the displacement of said rear-wheel output shaft; and
- a controller for controlling said electric motor and the operation of said clutch on the basis of signals from said steering angle sensor and said vehicle velocity sensor; and wherein said controller has a first function to operate said clutch to connect said rotational shaft of said electric motor and said rear-wheel output shaft to enable steering of the rear wheels by said electric motor only when the vehicle velocity detected by said vehicle velocity sensor is lower than a predetermined velocity; the steering centers of said rear wheels are positioned rearwardly from respective points of force applied to the rear wheels at the ground, with said rear-wheel output shaft being resiliently supported with respect to a body of the vehicle with a slight freedom of displacement in the axial direction, such that said rear wheels effect compliance steering when the vehicle velocity is above said predetermined velocity; and said controller has an additional function to reduce the steering angle gradually in a case where the rear wheels have a steering angle when the vehicle velocity is zero and a predetermined time has elapsed.

* * * * *